US012650335B2

(12) United States Patent
Leroux

(10) Patent No.: US 12,650,335 B2
(45) Date of Patent: Jun. 9, 2026

(54) OPTICAL DEVICE ALLOWING THE ANGULAR EMISSION PATTERN OF A LIGHT SOURCE OF FINITE AREA TO BE RAPIDLY MEASURED

(71) Applicant: ELDIM, Herouville-Saint-Clair (FR)

(72) Inventor: Thierry Leroux, Bavent (FR)

(73) Assignee: ELDIM, Herouville-Saint-Clair (FR)

( * ) Notice: Subject to any disclaimer, the term of this patent is extended or adjusted under 35 U.S.C. 154(b) by 955 days.

(21) Appl. No.: 17/905,223

(22) PCT Filed: Feb. 25, 2021

(86) PCT No.: PCT/FR2021/050327
§ 371 (c)(1),
(2) Date: Aug. 29, 2022

(87) PCT Pub. No.: WO2021/170960
PCT Pub. Date: Sep. 2, 2021

(65) Prior Publication Data
US 2023/0117589 A1 Apr. 20, 2023

(30) Foreign Application Priority Data

Feb. 28, 2020 (FR) ...................................... 2002026

(51) Int. Cl.
*G01J 1/02* (2006.01)
*G01J 1/04* (2006.01)
*G01J 1/42* (2006.01)

(52) U.S. Cl.
CPC ........... *G01J 1/0242* (2013.01); *G01J 1/0411* (2013.01); *G01J 1/0474* (2013.01); *G01J 2001/4247* (2013.01)

(58) Field of Classification Search
CPC ...... G01J 1/0242; G01J 1/0411; G01J 1/0474; G01J 2001/4247
See application file for complete search history.

(56) References Cited

U.S. PATENT DOCUMENTS

| | | | | |
|---|---|---|---|---|
| 4,191,990 | A | 3/1980 | Beeftink | |
| 6,217,176 | B1 * | 4/2001 | Maekawa | ............... G02B 1/111 359/601 |

(Continued)

FOREIGN PATENT DOCUMENTS

| | | |
|---|---|---|
| CN | 202101836 | 1/2012 |
| FR | 2749388 | 8/1998 |

(Continued)

OTHER PUBLICATIONS

Burger et al. "Methodology for in Situ Characterisation of a Highly Birefringent Photonic Crystal Fibre for Supercontinuum Generation" (Year: 2012).*

(Continued)

*Primary Examiner* — Assres H Woldemaryam
(74) *Attorney, Agent, or Firm* — TraskBritt

(57) ABSTRACT
A device allowing the angular emission pattern of a source to be measured without mechanical movement comprises, in succession, along its optical axis: a first objective, called the Fourier objective, arranged to form a Fourier surface each point of which corresponds to one direction of observation of the object; a diffuser used in transmission and placed on the Fourier surface; a substance of optical density placed upstream of the diffuser and arranged to attenuate the light backscattered toward the Fourier objective and the areal source; and a video photometer located downstream of the plane of the diffuser and arranged to image the surface of the diffuser.

13 Claims, 8 Drawing Sheets

(56) References Cited

U.S. PATENT DOCUMENTS

| | | | | |
|---|---|---|---|---|
| 10,215,622 B2 | 2/2019 | Hammer et al. | | |
| 2005/0190350 A1* | 9/2005 | Shinoda | .............. | G03F 7/70108 |
| | | | | 355/53 |
| 2007/0064247 A1* | 3/2007 | Petit | ................... | G01B 11/0616 |
| | | | | 356/625 |
| 2014/0307245 A1* | 10/2014 | Tanaka | ............... | G03F 7/70566 |
| | | | | 355/71 |

FOREIGN PATENT DOCUMENTS

| | | | | | | |
|---|---|---|---|---|---|---|
| JP | 51-148442 | | 12/1976 | | | |
| JP | 63-309834 | A | 12/1988 | | | |
| JP | H08-136860 | A | 5/1996 | | | |
| JP | 2001-013039 | A | 1/2001 | | | |
| JP | 2004037156 | A | * | 2/2004 | | |
| WO | 00837923 | | 6/2000 | | | |
| WO | WO-2017199249 | A1 | * | 11/2017 | ....... | B29D 11/00865 |

OTHER PUBLICATIONS

Boher et al. "Rapid Photo-goniometric Technique for LED Emission Characterization" (Year: 2004).*
Description_JP2004037156A_Translation.pdf.*
Moreno et al."Three-dimensional measurement of light-emitting diode radiation pattern: a rapid estimation" (Year: 2009).*
Japanese Written Opinion for Application No. 2022-551782 dated Feb. 19, 2025, 6 pages.
Japanese Notice of Reasons for Refusal for Application No. 2022-551782 dated Nov. 28, 2024, 12 pages with English translation.
Boher et al., Quality Control Optical Characterization of NIR VCSEL Based Light Sources for 3D Imaging Applications, 1130006-8Process of SPIE, vol. 11300, (2020), pp. 1130006-1-1130006-8.
Burger et al. Methodology for In situ Characterization of a Highly Birefringent Photonic Crystal Fibre for Supercontinuum Generation, Saieeafrica Research Journal, vol. 103, No. 1, (Mar. 1, 2012), pp. 35-40.
International Search Report for International Application No. PCT/FR2021/050327 dated May 25, 2021, 3 pages.
International Written Opinion for International Application No. PCT/FR2021/050327 dated May 25, 2021, 8 pages.
Moreno et al., Three-Dimensional Measurement of Light-Emitting Diode Radiation Pattern: A Rapid Estimation; Three-Dimensional Measurement of Light-Emitting Diode Radiation Pattern, Measurement Science and Technology, vol. 20, No. 7, (Jul. 1, 2009), p. 75306.
Radian Vision Systems, Lighting Design, https ://web .arc hi ve.org/web/20 191222135654/https://www.radiantvisionsystems. com/industries/lightingdesign, (Oct. 21, 2020), 7 pages.
Radian Vision Systems, NIR Intensity Lens, http:/ /web .archive. org/web/20 191222063 29/https ://I www.radiantvisionsystems. com/products/nir-intensit y-lens, (Dec. 22, 2019), 6 pages.
Collomb-Patton et al., Comprehensive Survey on Viewing Angle Measurement Devices: A Theoretical Study, Sid Symposium Digest of Technical Papers, https://www.researchgate.net/publication/ 251001551_174_Comprehensive_Survey_on_Viewing_Angle_ Measurement_Devices_A_Theoretical_Study, (2009), 4 pages.
Rykowski et al., The Use of an Imaging Sphere for High-Throughput Measurements of Display Performance—Technical Challenges and Mathematical Solutions, SID Conference, 9.3, https:// citeseerx.ist.psu.edu/viewdoc/download?doi=10.1.1.522.6062&rep= rep1&type=pdf, (2006), 4 pages.
IEC 60825-1:2014, Safety of Laser Products—Part 1: Equipment Classification and Requirements, (2014), 3 pages.
Chinese Office Action and Search Report for Application No. 202180016854.7 dated Jun. 26, 2025, 12 pages.
Japanese Notice of Reasons for Refusal for Application No. 2022-551782 dated May 19, 2025, 8 pages with English translation.

* cited by examiner

Distance D (mm)

OPTICAL DEVICE ALLOWING THE ANGULAR EMISSION PATTERN OF A LIGHT SOURCE OF FINITE AREA TO BE RAPIDLY MEASURED

CROSS-REFERENCE TO RELATED APPLICATIONS

This application is a national phase entry under 35 U.S.C. § 371 of International Patent Application PCT/FR2021/050327, filed Feb. 25, 2021, designating the United States of America and published as International Patent Publication WO 2021/170960 A1 on Sep. 2, 2021, which claims the benefit under Article 8 of the Patent Cooperation Treaty to French Patent Application Serial No. FR2002026, filed Feb. 28, 2020.

TECHNICAL FIELD

The present disclosure relates to a radiometric measuring device for rapidly measuring the angular emission pattern of a light source of finite area with a high angular resolution and a large angular aperture. It applies, in particular, to sources of light radiation of the laser or light-emitting diode type, and matrices of these components, which can be used in applications such as 3D sensors for autonomous vehicles or smartphones.

BACKGROUND

The simplest method to measure the far-field angular emission pattern of a light source is to project the emitted light onto a diffusing screen and to use a video photometer to measure the light scattered by the screen. A position/emission angle calibration then makes it possible to deduce the angular emission pattern of the source. This technique has been used for a long time, since it is simple to implement. This measurement configuration is described, in particular, in U.S. Ser. No. 10/215,622 B2. FIG. 1 of the present disclosure shows a schematic view of this type of configuration. The source 1 of diameter d emits light in a cone of half-angle θ on a diffusing surface 8 located at a distance D from the source. The light re-emitted in all directions is picked up by a video photometer 9, which gives an image of the emission cone of the source. After calibration of the system and correction of the geometric distortions, the far-field angular emission pattern of the source 1 over an angular aperture 2θ can be deduced.

This arrangement has several drawbacks. The source and the video photometer cannot be oriented along the same axis for reasons of obstruction, which induces distortions either on the emission cone or on the image obtained. Diffusion on the screen induces significant stray light that must be absorbed, which is all the more difficult as the size of the system is large. Finally, if the size d of the source is not negligible compared to the size of the diffusing screen, the maximum angular resolution Δθ is limited:

$$\Delta\theta = 2*\mathrm{ArcTan}\!\left(\frac{d}{2D}\right)$$

The maximum angular resolution can be improved by increasing the distance D between the source and the diffusing screen, but the minimum diameter of the diffusing screen W increases to maintain the same angular aperture θ:

$$W=2D*\mathrm{ArcTan}(\theta)$$

As shown in FIG. 2, which gives the maximum angular resolution of the system as a function of the distance D for a few source sizes, the necessary distance increases rapidly with the source size to maintain an angular resolution lower than 1 or 2 degrees. The size of the diffusing screen then quickly becomes prohibitive if large angular apertures are necessary, making the problems of stray light on these large devices unmanageable. Measurement systems based on this type of configuration are, however, marketed by various companies.

A simple variant of the system that replaces the diffusing screen with a transmission diffuser 8 is shown in FIG. 4 of the present disclosure and marketed by the company Gamma Scientific under the name VCSEL Test Systems (for Vertical Cavity Surface Emitting Laser Systems). The offset of the video photometer 9 on the other side of the diffuser overcomes the problems of distortion, since the source 1 and the video photometer can be aligned along the same axis. The angular resolution and angular aperture constraints are of course the same as above. The thickness of the diffuser must also be as small as possible so as not to affect the angular resolution of the system, which becomes all the more difficult as the size of the system, and therefore of the diffuser, increases. This configuration is called the transmission configuration.

Another variant of this type of system, whose principle assembly is described in WO 00/37923 and more recently for the characterization of light sources in CN 202101836 U, was marketed by the company Radiant Imaging in 2006 (see Rykowski, D. Kreysar, S. Wadman, "The use of an imaging sphere for high throughput measurements of display performance—technical challenges and mathematical solutions," SID Conference, 9.3, 2006). This assembly uses a diffusing hemisphere instead of the diffusing screen according to the system configuration shown schematically in FIG. 5. The source 1 to be measured is positioned at the center of the hemisphere 8. The bottom 10 of the hemisphere 8 consists of a material that is as absorbent as possible to reduce parasitic reflections. The light scattered by the hemisphere is imaged by a slightly off-axis video photometer 9 using a convex mirror 11. The main advantage of this optical assembly is that it allows a large angular aperture close to 180 degrees, but the angular resolution problems linked to the geometric constraints are exactly the same as before. On the other hand, the stray light scattered several times by the hemisphere requires complex corrections (see V. Collomb-Patton, P. Boher, T. Leroux, "Comprehensive survey of viewing angle measurement devices: a theoretical study," SID Conference, San Antonio, 17.4 (2009) for a comparison with other techniques).

All of the techniques discussed above are limited in resolution. Moreover, they cannot allow the measurement of a source as observed at a fixed distance according to the various observation angles.

To rapidly measure the angular emission pattern of sources with a high angular resolution and a large angular aperture, the preferred technique involves using a Fourier objective associated with an imaging sensor. This technique has been patented and is described in document FR 2 749 388 A. The principle of this system is shown in FIG. 6 of the present document. The system comprises a Fourier objective 2 enabling collection of the light emitted by a zone of the object 1 and refocusing in each direction of observation on a focal plane, which is referred to as the Fourier plane 3. This plane is re-imaged on a two-dimensional sensor 7 through field lenses 4 and a transfer lens 6. A diaphragm 5 located between the field lenses 4 and the transfer lens 6 and optically conjugated to the measurement zone on the object 1 makes it possible to define the apparent size of the measured zone independently of the direction of observation. The measurement carried out by this type of optical system makes it possible to evaluate the far-field emission of the source under study.

This optical system is well suited to the measurement of areal light sources larger in size than the measurement zone defined by the diaphragm 5.

Although it allows high-resolution measurements, the system illustrated in FIG. 6 nevertheless has a disadvantage when measuring sources smaller in size than the measurement zone. Indeed, if the source to be measured does not remain perfectly aligned with the optical axis of the system, the principal ray of each beam of light emitted in a particular direction will be focused on the first Fourier plane (3), and a fortiori on the secondary Fourier plane (3bis), which is the direct image of the first, along an angle that will vary with the shift of the source. The average angle of incidence on the two-dimensional sensor 7 will therefore vary, and depending on the characteristics of the sensor and its sensitivity to the angle of incidence, the result of the measurement can depend quite significantly on the position of the source inside the measurement zone defined by the diaphragm 5.

Moreover, this device requires three different objectives, 2, 4 and 6, and therefore the use of numerous lenses.

Finally, due to the application of the law of conservation of the throughput applicable to such a device, the larger the surface to be observed and/or the larger the angular aperture, the greater the aperture constraints will be on the objective 6, quickly making the cost of the system prohibitive.

BRIEF SUMMARY

One aim of the present disclosure is, in particular, to address all or part of the aforementioned drawbacks.

According to a first aspect of the present disclosure, proposed is a device making it possible to measure the angular emission pattern of a light source, preferably without mechanical movement.

The device according to the first aspect of the present disclosure comprises, in succession along its optical axis:
  a first so-called Fourier objective, arranged to form a
    Fourier surface, each point of which corresponds to a
    direction of observation of the object,
  a diffusing surface used in transmission and arranged on
    the Fourier surface,
  a video photometer located downstream of the diffusing
    surface and arranged to image the diffusing surface.

The Fourier surface is often described in the literature as a Fourier plane, under ideal conditions. In practice, it is not a plane but a surface, of symmetry of revolution about the axis of the system.

The device may comprise a substance of optical density, for example, an absorbing layer or blade, arranged upstream of the diffusing surface and arranged to attenuate the light backscattered toward the Fourier objective and the studied source. The substance of optical density described here is sometimes referred to as an "absorbing layer" or "density filter."

The device can be calibrated by a means for calibrating the correspondence between the position on the diffuser and the emission angle of the source studied to deduce the angular emission pattern of the source in real time.

According to a first possibility, each point of the Fourier surface corresponds to a single angular direction of emission of the source. It is thus possible to measure the far-field light emission of the source.

According to a second possibility, in which each point of the Fourier surface corresponds to all the rays of light emitted by the source, observed at a fixed distance and in an angular direction of observation. This allows the measurement of the source seen at this fixed distance and in this direction. Thus, a device is proposed making it possible to measure the angular emission pattern of a source seen at a determined distance, without mechanical movement, in order, for example, to ensure its innocuousness for the human eye.

The Fourier objective collects the light emitted by the source as seen at a given distance and not at infinity as according to the first possibility, before refocusing it on the Fourier surface. In this case, each point of this surface corresponds to all of the beams coming from the source and converging at a point located in a given angular direction and at a fixed distance from the source. Preferably, the fixed distance is 10 cm. The distance of 10 cm is recommended by certain standards to simulate the collection of light by the human eye. Other standardized viewing distances exist. According to one possibility, the fixed distance is determined by another such standardized observation distance.

Preferably, the optical axis of the video photometer is oriented parallel to the normal of the studied source.

According to one embodiment, the density-diffuser pair can be formed by a substance of optical density, for example, flat, frosted on one side and with an anti-reflective treatment on the second side.

According to another embodiment, the density/diffuser pair can be formed by a substance of optical density, for example, flat, with a diffusing film bonded to one side and an antireflective treatment bonded to the other side.

According to another aspect of the present disclosure, proposed is a method for measuring the angular emission pattern of a light source of finite area, comprising placing successively, in succession along an optical axis:
  a first objective, called Fourier objective, forming a
    Fourier surface, each point of which corresponds to a
    direction of observation of the object,
  a diffusing surface used in transmission and arranged on
    the Fourier surface of the first objective,
  a video photometer located downstream of the diffusing
    surface (8) and arranged to image the diffusing surface.

BRIEF DESCRIPTION OF THE DRAWINGS

Other advantages and particularities of the present disclosure will become apparent on reading the detailed description of implementations and embodiments, which are in no way limiting, with reference to the accompanying drawings.

This primary Fourier plane is reimaged on a secondary Fourier plane 3bis via field lenses 4 and a transfer lens 6. The diaphragm 5 optically conjugated to the measurement zone on the object 1 makes it possible to define the apparent size of the measured zone independently of the direction of observation. Detection is performed by a matrix of detectors located on the secondary Fourier plane 3bis.

Figure 1:
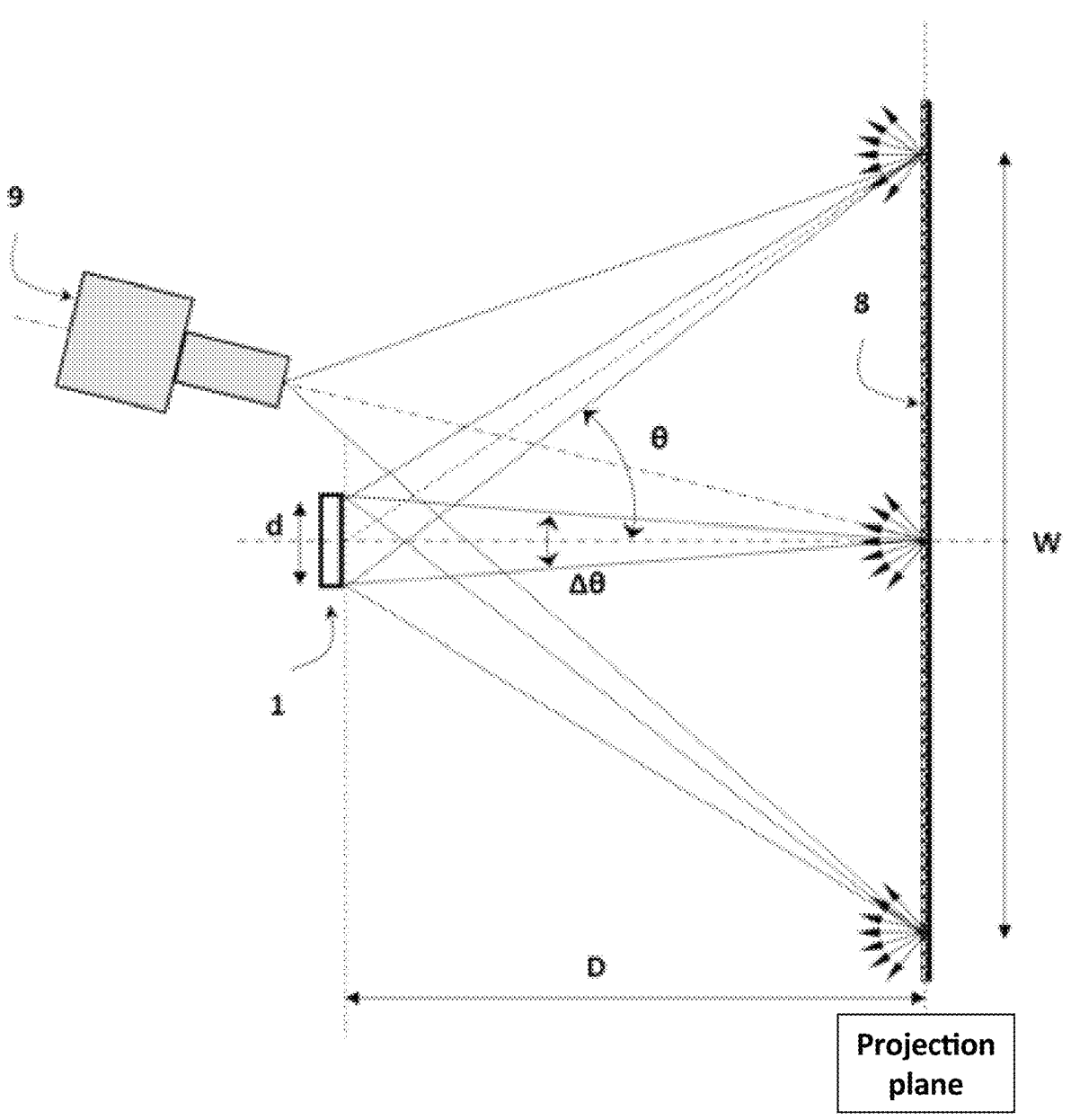
FIG. 1 describes a state of the prior art dedicated to the far-field angular measurement of a light source.
Figure 2:
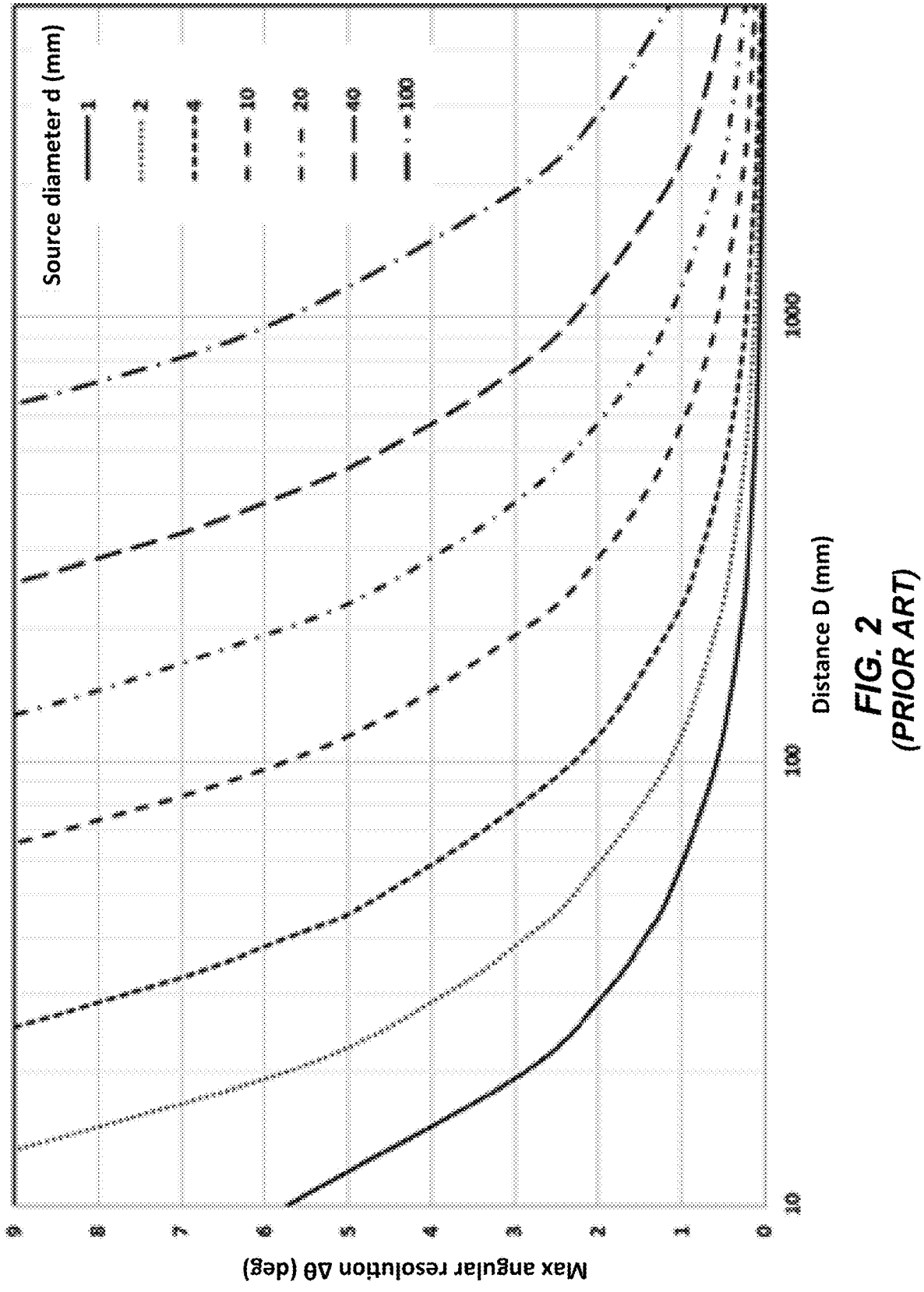
FIGS. 2 and 3 respectively give the angular resolution and the size of the diffusing screen of the system of FIG. 1 according to the source-diffusing screen distance for some diameters of sources and some angular apertures of the system.
Figure 3:
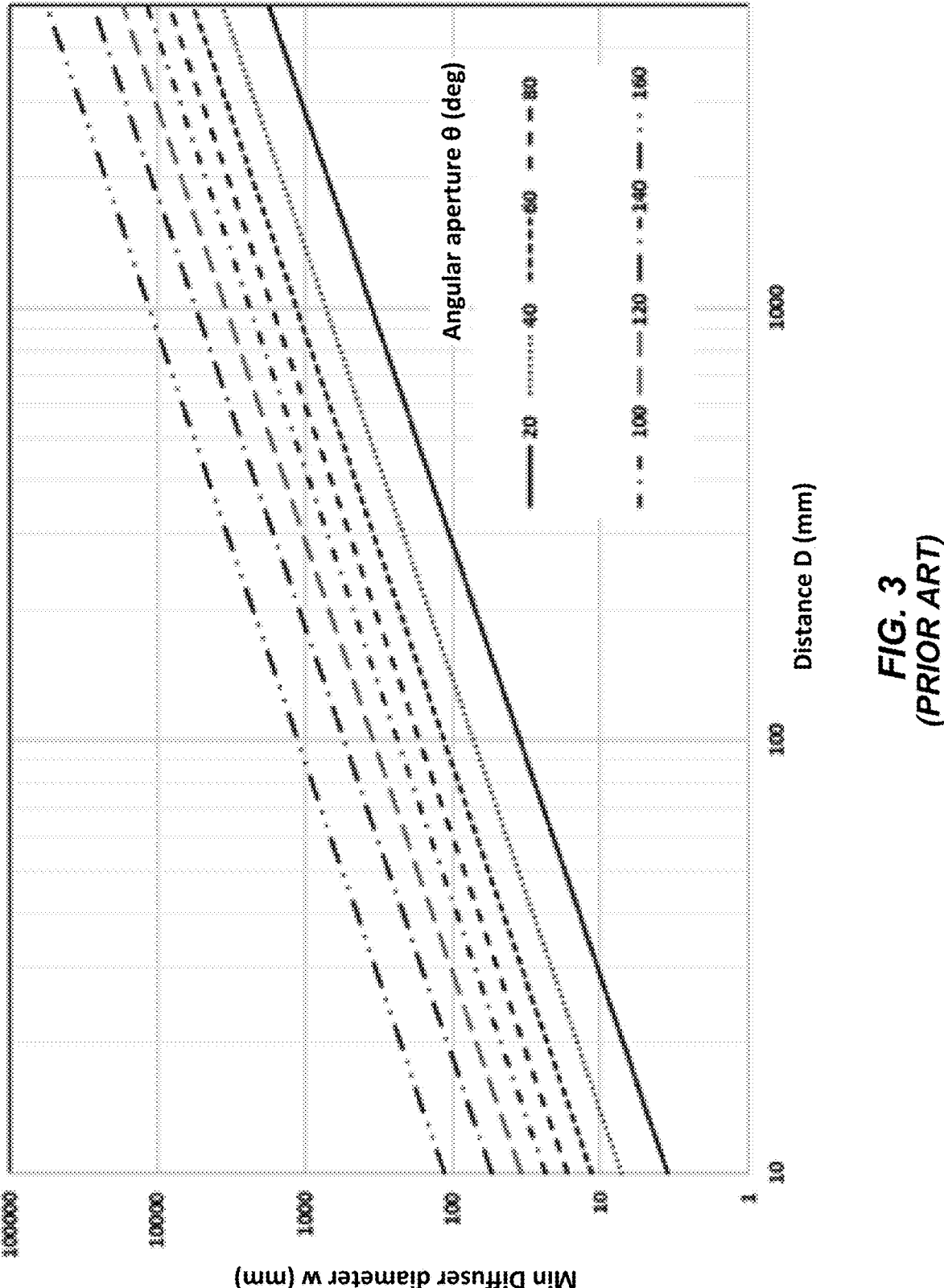
Figure 4:
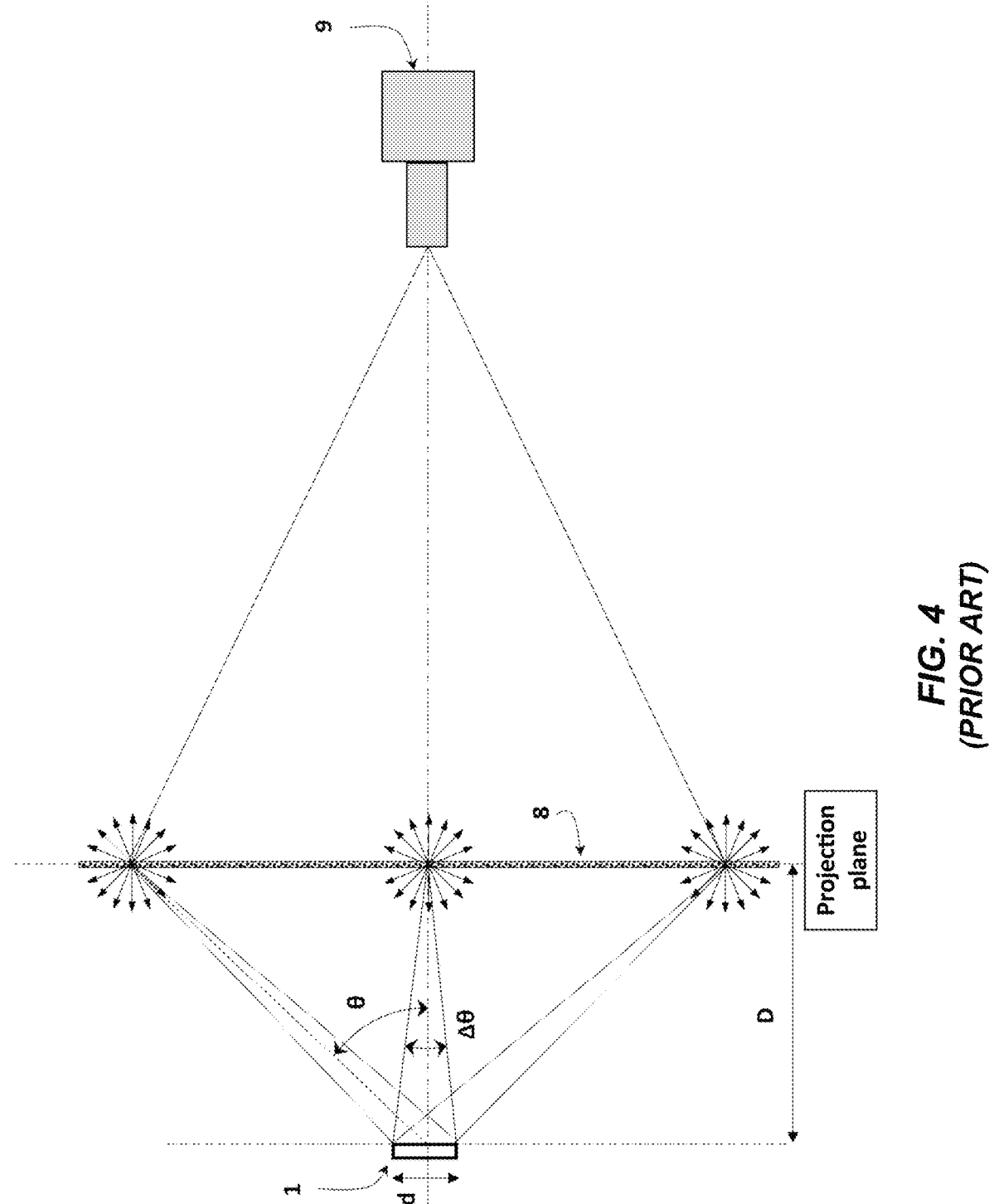
FIG. 4 describes a version of the prior art using a diffuser in transmission instead of the diffusing screen of FIG. 1. The system no longer has geometric distortion, because the video photometer 9 can be aligned on the optical axis of the source, but the constraints of FIG. 2 are still valid.
Figure 5:
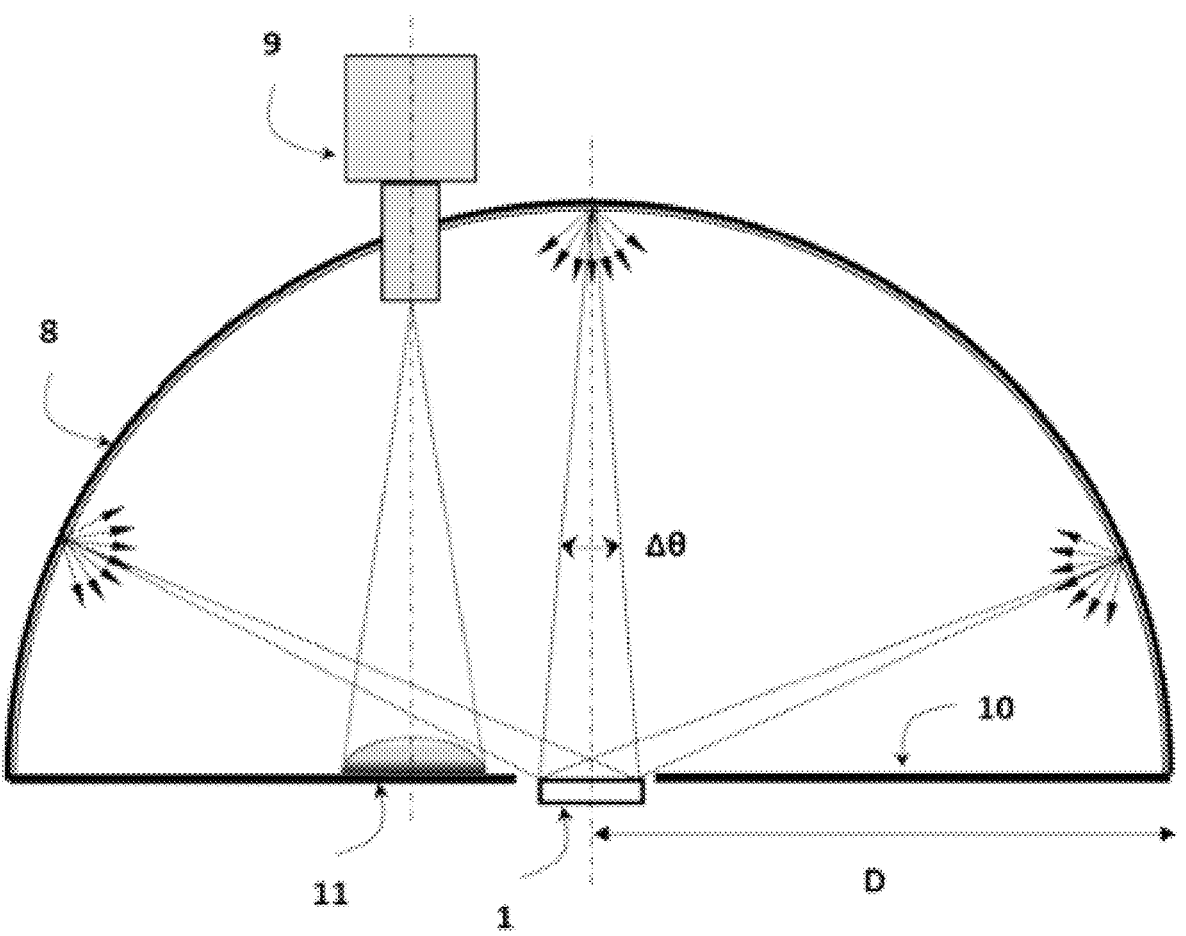
FIG. 5 describes another version of the prior art that uses a diffusing hemisphere instead of the diffusing screen. The surface of the hemisphere is imaged by a convex mirror 11 and a slightly off-axis video photometer 9. The angular aperture of the system is always large regardless of the size of the sphere, but the angular resolution is always subject to the constraints of FIG. 2.
Figure 7:
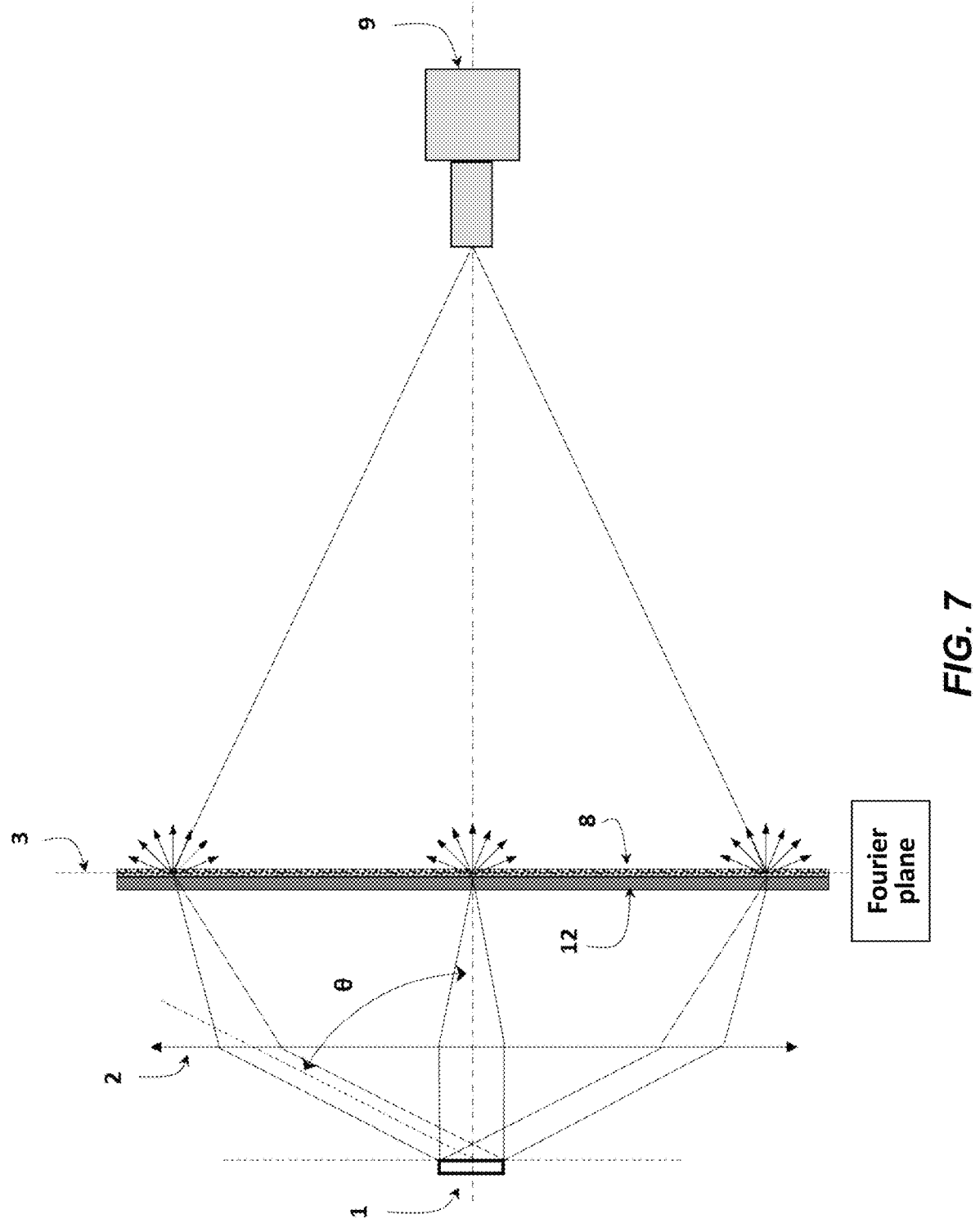

FIG. 7 shows the principle of the present disclosure based on the assembly of FIG. 4 including a Fourier objective 2 that focuses each direction of emission on a diffuser 8 shown flat in the figure, but that can be a surface of revolution. A substance of optical density 12 can be positioned in front of the diffuser to strongly attenuate the stray light backscattered toward the source. The angular measurement is carried out by a video photometer 9 on the other side of the plane of the diffuser.

Figure 8:
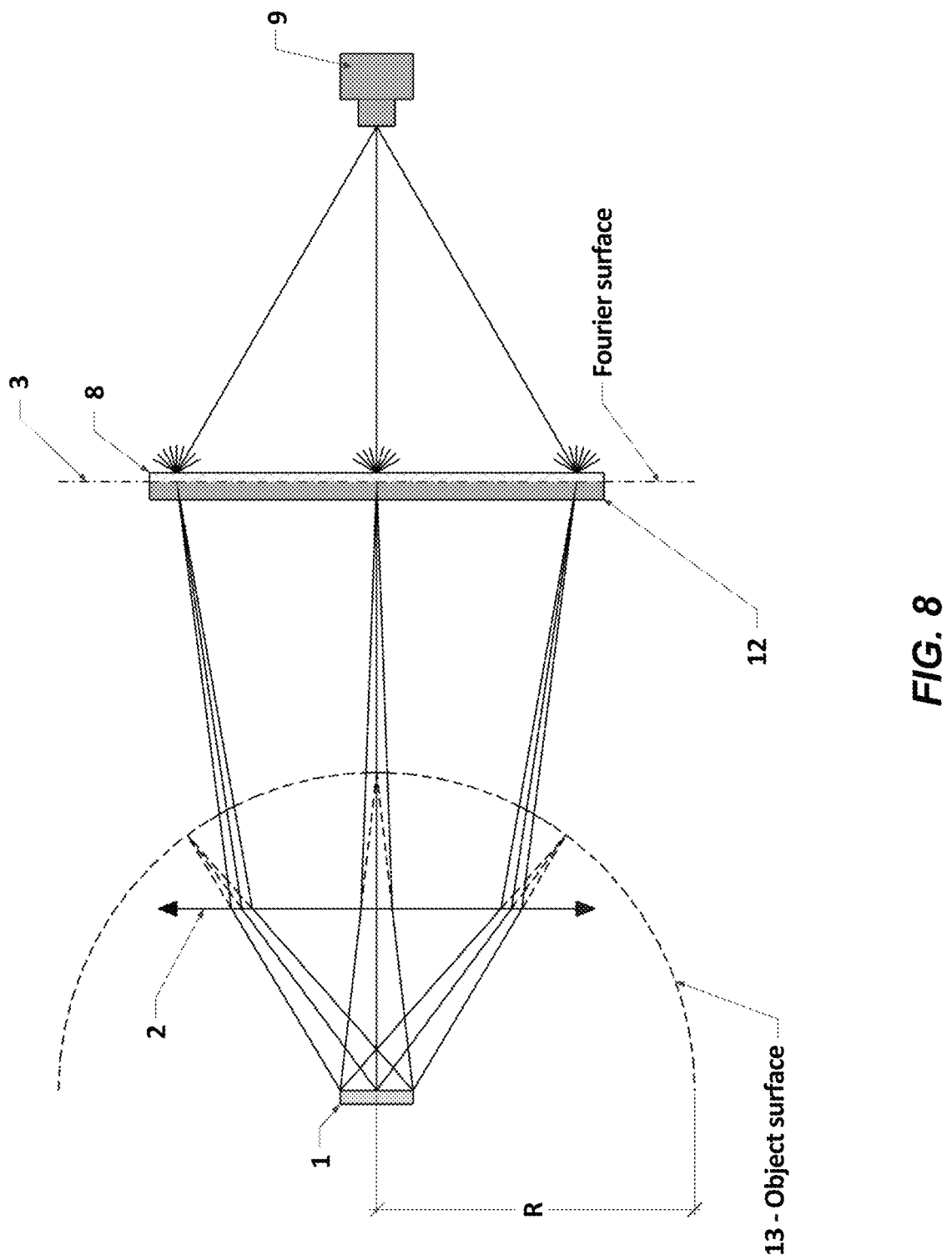

FIG. 8 shows a particular configuration of the present disclosure including a particular Fourier objective 2 that collects the light coming from the source by simulating the vision of the source at a distance R (typically 10 cm). Each point of view on the sphere 13 of radius R is refocused on the same type of diffuser/substance of optical density 8, 12. In this particular configuration, the source is seen at a finite distance R, and not at infinity as with a conventional Fourier objective.

DETAILED DESCRIPTION

Since the embodiments described hereinafter are not limiting in nature, it is possible, in particular, to consider variants of the present disclosure that comprise only a selection from the features that are described, provided that this selection of features is sufficient to confer a technical advantage or to differentiate embodiments of the present disclosure from the prior art. This selection comprises at least one preferably functional feature without structural details, or with only a portion of the structural details if this portion alone is sufficient to confer a technical advantage or to differentiate the present disclosure from the prior art.

The present disclosure is based on the transmission configuration as shown schematically in FIG. 4.

It is shown schematically in FIG. 7, where two additional elements are added: a Fourier objective 2 between the emissive source 1 and the diffuser in transmission, which can either be flat or can follow a chosen surface of revolution 3, and possibly a substance of optical density 12 located before the diffuser. These two additional elements bring three decisive advantages for the practical realization of the device.

Figure 6:
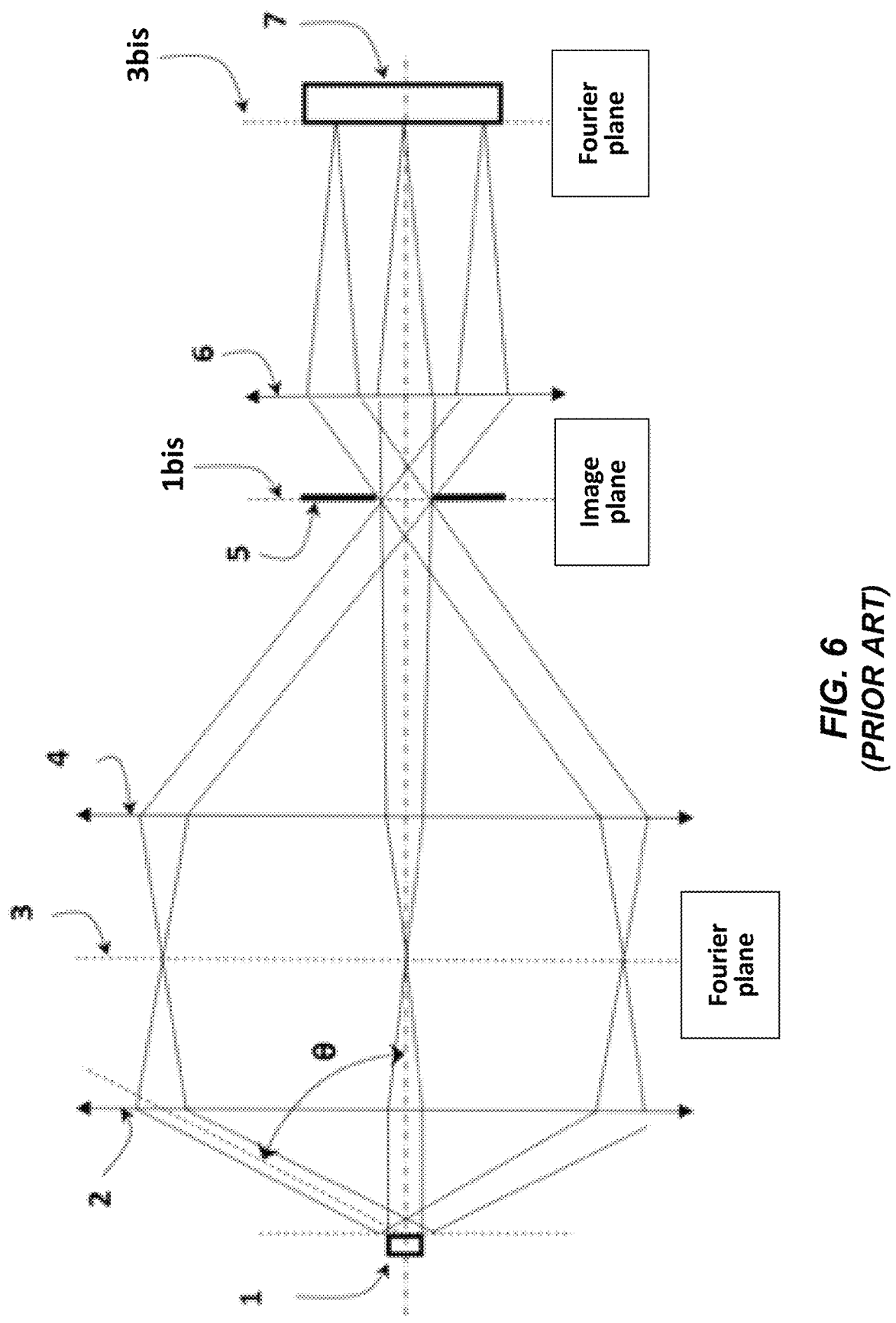
FIG. 6 describes a state of the prior art based on a Fourier objective device. The light emitted by the source 1 is collected by a Fourier objective 2 that refocuses each direction coming from the object 1 on a primary Fourier plane 3.

The Fourier objective 2 ensures the collection of each beam of light coming from the entire surface of the emissive object 1 and its focusing on the surface of the diffuser. Under these conditions, the angular resolution of the system is no longer defined by the size conditions of the system, but by the intrinsic characteristics of the Fourier objective 2. It can therefore be very good for large sources without the geometric constraints on the distance and the size of the diffuser that were explained previously. The constraints related to the realization of this Fourier objective are also different from those related to the classic Fourier systems shown in FIG. 6. In the latter case, the focusing must be carried out as parallel as possible to the optical axis of the system for all the angles of incidence, which requires complex optics. The location of the focal points is not necessarily a plane, but a surface of revolution. In the case of the present disclosure, the location of the focal points must be on the surface of the diffuser, which can be either a plane or any surface of revolution, but the angles of incidence of each beam of light do not need to be oriented along the optical axis of the system, which eliminates a major constraint on the practical realization of this optic. A deviation of a few tens of degrees is permissible, since the diffuser is able to do its job even for off-axis light beams. Eliminating this constraint means that the Fourier objective can be produced with a limited size and a reasonable cost, even for source sizes of a few cm$^2$.

Introducing a substance of optical density before the plane of the diffuser also makes it possible to greatly reduce the stray light backscattered in the Fourier objective 2 and on the source 1. In fact, any backscattered light passes through the substance of optical density 12 twice, whereas the useful light detected by the video photometer 9 passes through it only once. To measure high-power light sources, setting up a substance of optical density does not pose any particular problem, and is even necessary in most cases to avoid saturation of the video photometer. If a substance of optical density of 1.0 is used, for example, the parasitic light backscattered in the system will be of the order of 1%, which will generate a reflected part in the measurement channel of less than 0.005% (untreated optics at a reflection of the order of 5%) that is completely negligible compared to the useful transmitted light for the measurement, which is of the order of 10%. The performance of the system, and, in particular, the angular resolution, are dependent on the quality of the diffuser, which must be very homogeneous and of the lowest possible thickness. A practical way to produce the density/diffuser pair is to use a black glass plate of calibrated thickness that is frosted on one side or with a diffusing film bonded on one of the sides. This plate must be anti-reflective on the other side to limit backscattered light.

Furthermore, the diffuser optically decouples the collection part constituted by the Fourier objective 2 and the substance of optical density 12, and the reception part constituted by the video photometer 9. As a result, the system becomes very insensitive to the alignment of the source with the optical axis of the system. The angle of incidence on the sensor depends only on the optical system of the video photometer 9 and is therefore completely independent of the position of the source owing to the decoupling produced by the diffuser.

The present disclosure as described previously measures the far-field angular emission pattern of a source. The Fourier objective 2 collects all the light beams emitted in a given direction and refocuses them at the same point on the Fourier surface where the diffuser is located. The source rays are observed to come from infinity, as is usually the case for this type of characterization.

In certain particular applications such as laser sources, the angular characterization also aims to ensure that the source complies with certain safety standards such as the IEC60825-1 standard (see IEC, "IEC 60825-1—Safety of laser products—Part 1: Equipment classification," 1.2 edition (2008)). In this case, for wavelengths between 400 and 1100 nm, the measuring device must simulate the human eye with a recommended observation distance of 10 cm. The conventional Fourier objective (2) can then be designed to observe a virtual spherical surface placed 10 cm from the source, as shown in FIG. 8. The angular data collected by the system over an angular aperture of at least 38.5° are then averaged over 4° corresponding to the angular aperture of the eye at 10 cm for a pupil diameter of 7 mm. The values obtained represent the maximum light collectable at each angle by the human eye and must not exceed a certain radiance to ensure the innocuousness of the source.

As will be readily understood, the present disclosure is not limited to the examples that have just been described, and numerous modifications may be made to these examples without departing from the scope of the invention as defined by the claims. In addition, the various features, forms, variants, and embodiments of the present disclosure may be grouped together in various combinations as long as they are not incompatible or mutually exclusive.

The invention claimed is:

1. A device for measuring an angular emission pattern of a light source of finite area, comprising, successively along an optical axis of the device:
    a first objective configured as a Fourier objective to form a Fourier surface, each point of the Fourier surface corresponding to a direction of observation of the light source;
    a substance of optical density configured to attenuate light backscattered toward the first objective and the light source;
    a diffusing surface used in transmission and arranged on the Fourier surface; and
    a video photometer located downstream of the diffusing surface and arranged to image the diffusing surface.

2. The device of claim 1, wherein each point of the Fourier surface corresponds to an angular direction of emission of the source.

3. The device of claim 2, wherein an optical axis of the video photometer is oriented parallel to a direction normal to the source.

4. The device of claim 3, wherein a density-diffuser pair is formed by the substance of optical density, the substance of optical density being frosted on one side and having an anti-reflective treatment on another side.

5. The device of claim 3, wherein a density-diffuser pair is formed by the substance of optical density and a diffusing film bonded on one side of the substance of optical density and bonded with an anti-reflective treatment on another side.

6. The device of claim 1, wherein each point of the Fourier surface corresponds to all rays of light emitted by the source, and converging at a point situated at a fixed distance from the source and in an angular direction of observation.

7. The device of claim 6, wherein an optical axis of the video photometer is oriented parallel to a direction normal to the source.

8. The device of claim 7, wherein a density-diffuser pair is formed by the substance of optical density, the substance of optical density being frosted on one side and having an anti-reflective treatment on another side.

9. The device of claim 7, wherein a density-diffuser pair is formed by the substance of optical density and a diffusing film bonded on one side of the substance of optical density and bonded with an anti-reflective treatment on another side.

10. The device of claim 1, wherein an optical axis of the video photometer is oriented parallel to a direction normal to the source.

11. The device of claim 1, wherein a density-diffuser pair is formed by the substance of optical density, the substance of optical density being frosted on one side and having an anti-reflective treatment on another side.

12. The device of claim 1, wherein a density-diffuser pair is formed by the substance of optical density and a diffusing film bonded on one side of the substance of optical density and bonded with an anti-reflective treatment on another side.

13. A method for measuring an angular emission pattern of a light source of finite area, the method comprising placing successively along an optical axis:
    a first objective configured as a Fourier objective forming a Fourier surface, each point of the Fourier surface corresponding to a direction of observation of the light source;
    a substance of optical density configured to attenuate light backscattered toward the first objective and the light source;
    a diffusing surface used in transmission and arranged on the Fourier surface; and
    a video photometer located downstream of the diffusing surface and arranged to image the diffusing surface.

* * * * *